US009858503B2

(12) United States Patent
Lu

(10) Patent No.: US 9,858,503 B2
(45) Date of Patent: Jan. 2, 2018

(54) ACCELERATION OF LINEAR CLASSIFIERS

(71) Applicant: HERE Global B.V., Eindhoven (NL)

(72) Inventor: Victor Lu, Urbana, IL (US)

(73) Assignee: HERE Global B.V., Eindhoven (NL)

( * ) Notice: Subject to any disclaimer, the term of this patent is extended or adjusted under 35 U.S.C. 154(b) by 64 days.

(21) Appl. No.: 14/851,677

(22) Filed: Sep. 11, 2015

(65) Prior Publication Data

US 2015/0379377 A1 Dec. 31, 2015

Related U.S. Application Data

(62) Division of application No. 13/828,912, filed on Mar. 14, 2013, now Pat. No. 9,158,992.

(51) Int. Cl.
*G06K 9/62* (2006.01)
*G06K 9/46* (2006.01)

(52) U.S. Cl.
CPC ......... *G06K 9/6282* (2013.01); *G06K 9/4642* (2013.01); *G06K 9/6256* (2013.01); *G06K 9/6269* (2013.01); *G06K 2209/25* (2013.01)

(58) Field of Classification Search
None
See application file for complete search history.

(56) References Cited

U.S. PATENT DOCUMENTS 7,882,091 B2 * 2/2011 Schneider ......... G06F 17/30011 382/305
2006/0072814 A1 * 4/2006 Messina ................ G06T 3/4015 382/162
2006/0083423 A1 * 4/2006 Brown ............... G06K 9/00362 382/159
2008/0285861 A1 * 11/2008 Mitarai ................ G06K 9/6234 382/224
2009/0136095 A1 * 5/2009 Marcon ............. G06K 9/00281 382/118
2011/0249867 A1 * 10/2011 Haas ................. G06K 9/00818 382/103
2012/0195476 A1 * 8/2012 Bayram ........... G06F 17/30799 382/124
2013/0236089 A1 * 9/2013 Litvak ................ G06K 9/00382 382/154
2013/0279794 A1 * 10/2013 Greenberg ............. G06T 7/001 382/149

(Continued)

OTHER PUBLICATIONS

Graf et al. "Classification in a Normalized Feature space using Support Vector Machines", IEEE Trans. Neural Networks ,2003.*

(Continued)

*Primary Examiner* — Randolph I Chu
(74) *Attorney, Agent, or Firm* — Alston & Bird LLP

(57) ABSTRACT

In one embodiment, image detection is improved or accelerated using an approximate range query to classify images. A controller is trained on a set of training feature vectors. The training feature vectors represent an image. The feature vectors are normalized to a uniform length. The controller defines a matching space that includes the set of training feature vectors. The controller is configured to identify whether an input vector for a tested image falls within the matching space based on a range query. When the input vector falls within the matching space, the tested image substantially matches the portion of the image used to train the controller.

18 Claims, 12 Drawing Sheets

S101
Receive a set of training feature vectors indicative of an image.

S103
Normalize the set of training feature vectors to a uniform length

S105
Define a matching space for identifying matching input image feature vectors according to the normalized set of training feature vectors.

S107
Storing the matching space.

(56) References Cited

U.S. PATENT DOCUMENTS

| | | | | |
|---|---|---|---|---|
| 2013/0279806 | A1* | 10/2013 | Tonisson | G06T 7/2033 382/173 |
| 2014/0079297 | A1* | 3/2014 | Tadayon | G06K 9/00 382/118 |

OTHER PUBLICATIONS

C. Dubout et al., Exact Acceleration of Linear Object Detectors, Accessed Jan. 22, 2013, Idiap Research Institute, Centre du Parc, Martigny, Switzerland.

C.-C. Chang et al., A Library for Support Vector Machines, Apr. 4, 2012, Department of Computer Science, National Taiwan University, Taipei, Taiwan.

Chih-Wei Hsu et al., A Practical Guide to Support Vector Classification, Apr. 15, 2010, Depatrment of Computer Science, National Taiwan University, Taipei 106, Taiwan.

Christoph H. Lampert et al., Beyond Sliding Windows: Object Localization by Efficient Subwindow Search, 2008, Max Planck Institute of Biological Cybernetics and Google, Inc., Tubingen, Germany and Zurich, Switzerland.

J. Revaud et al., Correlation-Based Burstiness for Logo Retrieval, Sep. 6, 2013, Version 1, ACM Multimedia.

L. Bourdev et al., Poselets: Body Part Detectors Trained Using 3D Human Pose Annotations, Accessed Jan. 22, 2013, EECS, U.C. Berkeley, Berkeley.

M. Muja et al., Fast Approximate Nearest Neighbors with Automatic Algorithm Configuration, Accessed Jan. 22, 2013, Computer Science Department, University of British Columbia, Vancouver, B.C., Canada.

P. Viola, Robust Real-Time Objection Detection, Accessed Jan. 22, 2013, IJCV.

P.F. Felzenszwalk et al., Object Detection with Discriminatively Trained Part Based Models, Accessed Jan. 22, 2013.

S. Hinterstoisser et al., Gradient Response Maps for Real-Time Detection of Texture-Less Objects, Accessed Jan. 22, 2013, IEEE Transactions on Pattern Analysis and Machine Intelligence.

S. Romberg et al., Scalable Logo Recognition in Real-World Images, Accessed Jan. 22, 2013, University of Augsburg, Augsburg, Germany.

S. Singh et al., Unsupervised Discovery of Mid-Level Discriminative Patches, Aug. 18, 2012, Carnegie Mellon University, Pittsburgh, PA.

Tomasz Malisiewicz et al., Exemplar-SVMs for Visual Object Detection, Label Transfer and Image Retrieval, Accessed Jan. 17, 2013, ICCV.

Restriction Requirement for U.S. Appl. No. 13/828,912, dated Oct. 15, 2014, 6 pages.

Office Action from U.S. Appl. No. 13/828,912, dated Jan. 5, 2015, 9 pages.

Notice of Allowance from U.S. Appl. No. 13/828,912, dated Jun. 8, 2015, 7 pages.

* cited by examiner

ACCELERATION OF LINEAR CLASSIFIERS

REFERENCE TO RELATED APPLICATIONS

This application is a divisional application under 35 U.S.C. §121 and 37 C.F.R. §1.53(b) of U.S. patent application Ser. No. 13/828,912 filed Mar. 14, 2013, the entire disclosure of which is hereby incorporated by reference.

FIELD

The following disclosure relates to data classification techniques, or more specifically data classification techniques for accelerating arrays of linear classifiers using approximate range queries.

BACKGROUND

Machine learning is a branch of artificial intelligence in which a computer is trained or learns from data to make future decisions regarding other data. One example, linear support vector machines (SVM), are models for learning algorithms that analyze data to recognize patterns. Given a set of example feature vectors with known binary classifications, the linear SVM separates the example feature vectors according to known classifications. New feature vectors with unknown classification are classified based on which side of a gap the feature vectors fall on.

Image processing for object detection may utilize such training algorithms. Object detection identifies objects in images for a variety of purposes including navigation, video surveillance, and other fields.

SUMMARY

In one embodiment, object detection is improved or accelerated using an approximate range query to classify image parts. A controller is trained on a set of training feature vectors. The training feature vectors are computed from training image parts, which represent instances of visual patterns of interest. The feature vectors are defined to have uniform length. In part because of the restriction that the feature vectors have uniform length, the controller defines a matching space that is a closed geometric shape. The controller is configured to identify the input feature vectors from an input image that fall within the matching space based on a range query. When an input feature vector falls within the matching space, the corresponding part of the input image is an instance of a visual pattern that the controller was trained to detect.

BRIEF DESCRIPTION OF THE DRAWINGS

Exemplary embodiments of the present invention are described herein with reference to the following drawings.

DETAILED DESCRIPTION

Figure 1:
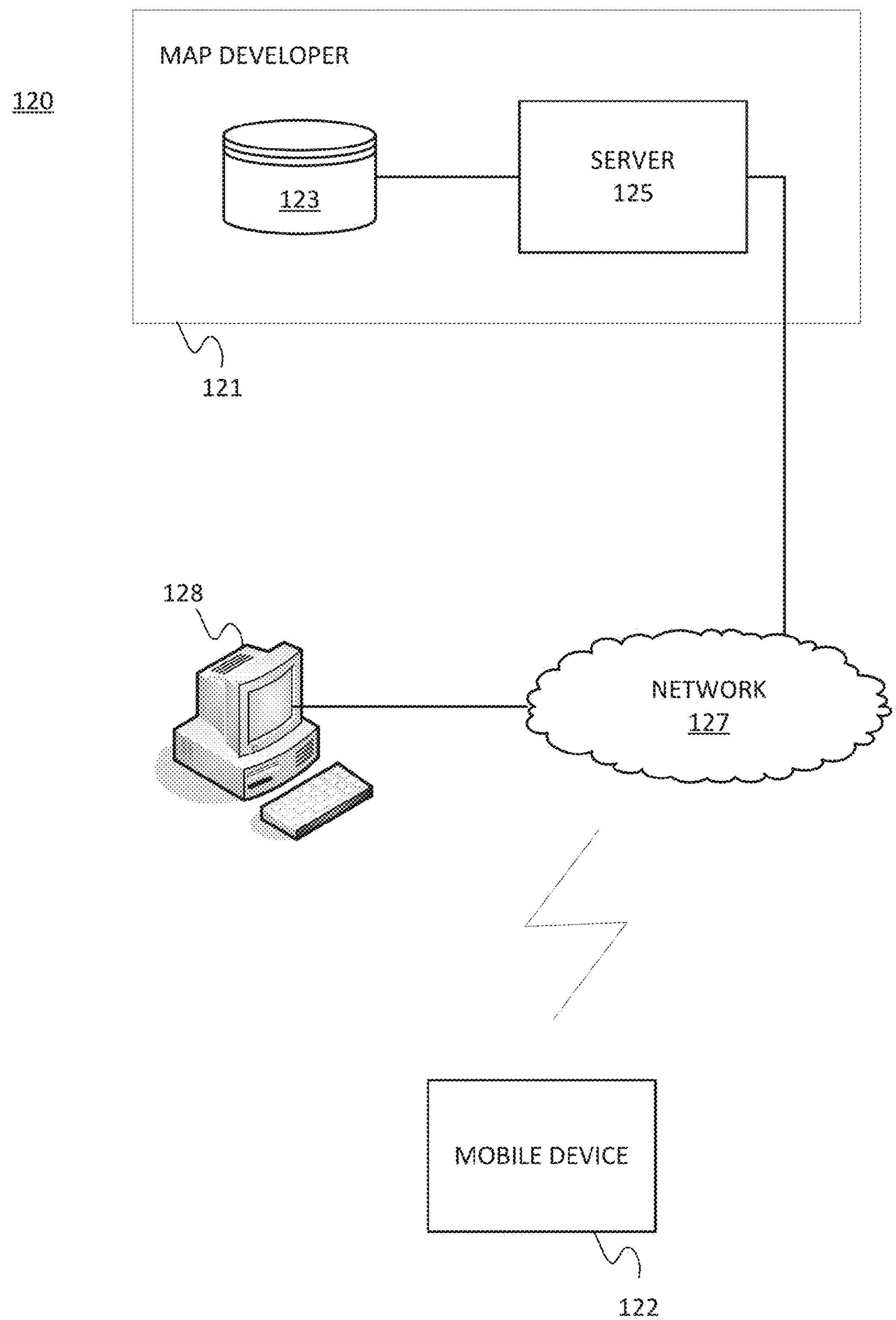
FIG. 1 illustrates an example system for image pattern recognition.

Object detection techniques may apply one or more binary linear classifiers onto a collection of feature vectors. Given an image on which object detection is to be performed on, a feature vector is extracted from each part of the image. A classifier trained to detect a specific visual pattern of interest is applied to the resulting feature vectors, identifying feature vectors that represent instances of the visual pattern of interest. The classifier is the mathematical function or the corresponding computer implemented instructions that apply the mathematical function to determine which of two alternative classifications should be given to a new feature vector. Additional classifiers can be used to capture other visual patterns of interest. The number of feature vectors in an image increases with image size, and a larger number of classifiers is needed to capture a wider variety of visual patterns. As both of these numbers increase, object detection becomes increasingly time consuming. The following implementations improve the efficiency of object detection.

Geometrically, the classifier may be a hyperplane or any type of linear classifier that divides vectors from one classification from vectors of the other classification. The classifier is defined by a weight vector (or query vector) and decision threshold. The weight vector may have any dimension (k-dimensional) and the decision threshold may be a scalar value of one dimension. Feature vectors may have any dimension (k-dimensional) and represent an image window. The feature vectors are defined to have a uniform length. The uniform length may be unit length. One technique for producing uniform length feature vectors is to project non-uniform length feature vectors onto a hypersphere centered at the origin.

Defining feature vectors to have uniform length simplifies classification because the matching space can be simplified. Rather than a half space that extends indefinitely, the matching space may be defined as a closed geometric space. The classifier is defined from the set of feature vectors and used to compare a new input vector to the matching space using the query vector and decision threshold of the classifier. The new input vector also has the uniform length. When a new input vector is within a predetermined distance from the query vector of the classifier, the input vector is classified as a positive match. The predetermined distance defines the matching space as a closed geometric space. Because the area formed by the predetermined distance around the query vector is a closed geometric space, the area can easily be analyzed using the approximate range query.

The range query is an operation that finds all vectors within a predetermined distance of a query vector. Range queries may be performed via algorithms that avoid examining all vectors and may hence result in significant time savings. The approximate range query trades off accuracy for additional speedups. A relatively small amount of accuracy is lost in exchange for a significant decrease in the amount of time required for searching. Thus, the approximate range query may simplify the classification process, operate faster, and consume less computing resources.

The approximate range query may include traversing a binary search tree such as a k-dimensional (k-d) tree. The k-d tree is a space partitioning data structure for organizing k-d vectors. The terminating ends of the tree are leaf nodes, which may store data. Each node that is not a leaf node divides the k-dimensional space into two parts, which may be equal or unequal in size. The node also divides the vectors into smaller groups. Each non-leaf node represents a hyperplane between the two parts of the space. The next node divides the corresponding part again into two parts, and so on. Thus, the binary search tree organizes the k-dimensional space. The binary search tree may be traversed to quickly determine the set of organized k-d vectors that are within a predetermined distance of a query vector.

In one implementation, the classifier is trained on a symbol or logo that identifies an object. The feature vectors for a plurality of the symbols are calculated. The plurality of symbols may be obtained from training images. Training images are images with known or predetermined features that are of interest. A hyperplane is selected to divide the k-dimensional space such that one part of the space includes all, or a majority, of the feature vectors for the symbol. Once the classifier is trained, a new image is searched for symbol instances by calculating all its feature vectors and identifying the ones that fall within the matching space of the classifier.

Other object detection techniques employ brute force calculations to identify the feature vectors that fall within a classifier's matching space. An array of m binary linear classifiers applied to a set of n feature vectors of an input image has a processing time in big O notation of O(mn). Inserting the feature vectors into a hierarchical spatial data structure, such as a k-d tree, may require a processing time such as O(n log n). However, the range queries over the feature vectors may reduce the processing time for the classification to O(m log n). Thus for large m the increase in efficiency for the classification more than outweighs the cost of building the spatial data structure.

An array of binary linear classifier may be referred to as a binary detector. The binary detectors based on non-uniform length feature vectors use brute force search and cannot use range queries because the classifiers' matching space has infinite extent. Binary detectors based instead on uniform length feature vectors can use range queries because the matching spaces of its classifiers can be modified into closed geometric shapes. A single range query quickly returns all feature vectors that fall within a closed geometric shape. A feature vector falling within a classifier's matching space may be referred to as positive and a feature vector falling outside of the matching space may be referred to as negative.

FIG. 1 illustrates an exemplary system 120 for analyzing images. The system 120 includes a map developer system 121, a mobile device 122, a workstation 128, and a network 127. Additional, different, or fewer components may be provided. For example, many mobile devices 122 and/or workstations 128 connect with the network 127. The developer system 121 includes a server 125 and a database 123. The optional workstation 128 is a general purpose computer including programming specialized for receiving user inputs. The workstation 128 includes at least a memory, a processor, and a communication interface. The developer system 121 may include computer systems and networks of a system operator (e.g., NAVTEQ or Nokia Corp.).

The computing resources necessary to generate and execute approximate range queries in image pattern recognition may be divided between the server 125 and the mobile device 122. In some embodiments, the server 125 performs a majority or all of the processing ("server-based embodiments"). In other embodiments, the mobile device 122 or the workstation 128 performs a majority or all of the processing ("endpoint-based embodiments"). In additional embodiments, the processing is divided substantially evenly between the server 125 and the mobile device 122 or workstation 128 ("hybrid embodiments"). As an example, the following initial discussion focuses on server-based embodiments.

The server 125 is configured to train classifiers and/or classify images with the trained classifiers. The phrase "train classifiers" includes defining classification parameters in a computer implemented set of instructions. The server 125 retrieves a set of training images from database 123. A training image may contain an interesting visual pattern, which may be referred to as a target image. The target image may be a portion of a larger image. The portion of the image may be a brand name, a logo, a pedestrian, a car, a license plate, a door, a road sign, or any part of the image. A target image represents an example of a visual pattern that the classifiers are trained to detect. A target image may be numerically described by feature values, which may be used to form a feature vector. Feature values can be easily analyzed statistically and mathematically, which allows for images to be compared through computation rather than appearance. The feature values may describe differences in image characteristics between adjacent pixels. The image characteristics may include one or more of multiple color components, brightness, edges, gradients, intensity, hue, luminance or other image characteristics. Haar wavelets may be used for the feature values.

The server 125 is configured to compute uniform length feature vectors on parts of one or more training images. The parts may comprise of a dense set of image locations across multiple image scales. The uniform length feature vectors may be computed by first computing non-uniform length feature vectors and then projected onto a hypersphere centered at the origin. Uniform length feature vectors corresponding to examples of a visual pattern may be identified based on training image annotations. Annotations may specify whether a pixel is part of an object of interest, such as a sign, a door, a person, etc. All other uniform length feature vectors may be identified as non-examples.

Server 125 is configured to then train a classifier that separates example uniform length feature vectors from non-example uniform length feature vectors. This amounts to computing a weight vector and a decision threshold. The weight vector and decision threshold specify a hyperplane, which may be referred to as the decision plane. In a two-dimensional example, the decision plane is a one-dimensional line, the weight vector is a vector perpendicular to the line, and the decision threshold is the product of the weight vector length with the distance from the line to the origin. The classifier, or equivalently, the weight vector and decision threshold may then be stored in database 123.

The server 125 is configured to receive a new input image. Server 125 computes uniform length feature vectors on parts of the input image. The server 125 retrieves a classifier from database 123 and identifies the one or more uniform length input image feature vectors that fall within the matching space of the classifier. The part of the input image corresponding to a matching uniform length input image feature vector is then interpreted as an instance of the visual pattern that the classifier is trained to detect.

The mobile device 122 is a smart phone, a mobile phone, a personal digital assistant ("PDA"), a tablet computer, a notebook computer, a personal navigation device ("PND"), a portable navigation device, and/or any other known or later developed portable or mobile device. The mobile device 122 includes one or more detectors or sensors as a positioning system built or embedded into or within the interior of the mobile device 122. The mobile device 122 receives location data from the positioning system.

The developer system 121, the workstation 128, and the mobile device 122 are coupled with the network 127. The phrase "coupled with" includes directly connected to or indirectly connected through one or more intermediate components. Such intermediate components may include hardware and/or software-based components. The network 127 is a cellular, local area, wide area, Internet, or other network.

Figure 2:
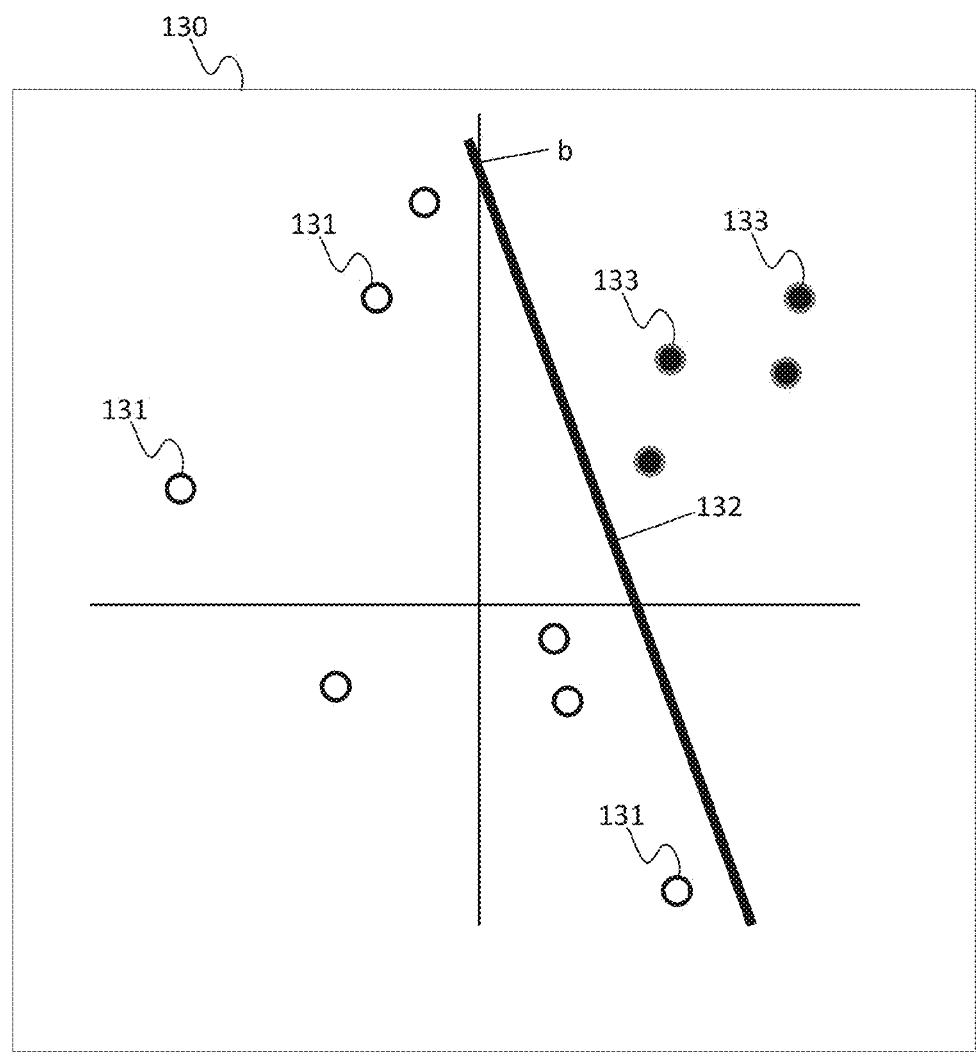
FIG. 2 illustrates an example decision plane.

A more detailed implementation for generating and executing approximate range queries in image pattern recognition is described with reference to FIGS. 2-7. FIG. 2 illustrates an example decision plane 132 in an underlying space 130. The underlying space 130 may have any number of dimensions k, where k may exceed 10, 50 or higher. The decision plane 132, which is k-1 dimensional and has an infinite length in at least one dimension, is a classifier or gap that divides matching feature vectors 133 from non-matching feature vectors 131. The decision plane 132 may be used in the brute force technique. For example, the brute force technique involves calculating the signed distances from input vectors to the decision plane 132 to determine which input vectors lie above or below the decision plane 132.

A window slides across the image to define subsequent input vectors, which are used to search the available image for the target image. Geometrically, the comparison with the decision plane 132 corresponds to determining whether a feature vector x lies in the half space defined by Equation 1. In equation 1, w is the trained weight vector and b is decision threshold constant. The decision threshold b may be proportional to the distance from decision plane 132 to the origin. The feature vector x represents the local appearance of the image at a position of the window.

$$w{\cdot}x-b\geq 0 \qquad \text{Eq. 1}$$

Figure 3:
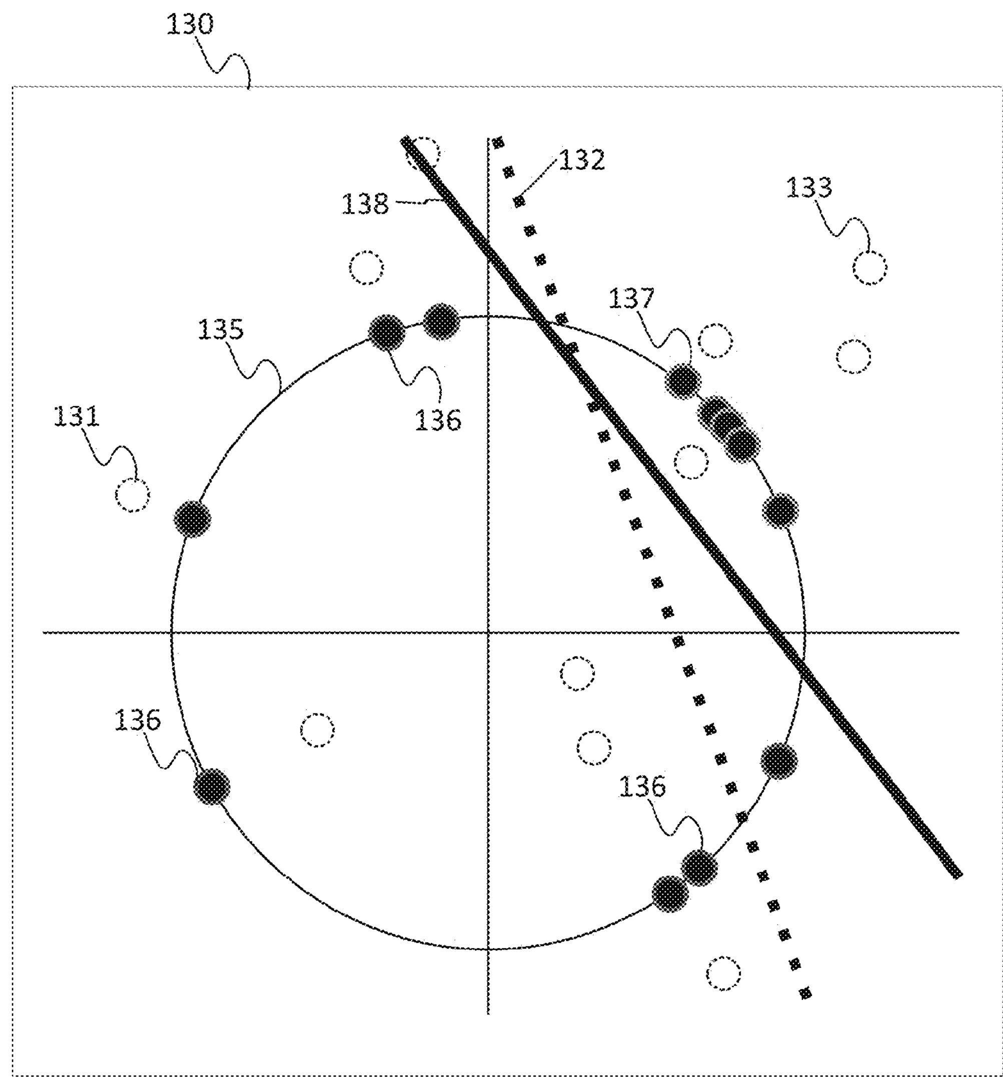
FIG. 3 illustrates an example modified decision plane.

However, the brute force technique, which performs calculations to check the inequality in Equation 1 for every vector in FIG. 2, requires significant computations when there are many vectors. One or more vectors satisfying Equation 1, can be found using the range query if feature vectors are transformed to a uniform length, as shown in FIG. 3. FIG. 3 illustrates the data space 130 including an example modified decision plane 138. The modified decision plane 138 divides the matching space (above the modified decision plane 138) from the non-matching space (below the modified decision plane 138).

The matching feature vectors 133 and non-matching feature vectors 131 of FIG. 2 are shown with dotted circles. The server 125 is configured to normalize the matching feature vectors 133 and the non-matching feature vectors 131 to a uniform length. The uniform length may be unit length or another length. In one implementation, the server 125 is configured to project the feature vectors onto a hypersphere 135. For vectors having k dimensions, the hypersphere 135 has k-1 dimensions. The hypersphere 135 may have unit length and be centered at the origin. The feature vectors may be normalized by projecting the feature vectors onto the unit length hypersphere 135.

For example, each feature vector may be divided by the magnitude of the feature vector to calculate a unit length feature vector on the hypersphere 135. The matching feature vectors 133 are projected onto the hypersphere 135 as projected matching vectors 137. The non-matching feature vectors 131 are projected onto the hypersphere 135 as projected non-matching vectors 136. The modified decision plane 138 divides the projected non-matching vectors 136 and the projected matching vectors 137.

Figure 4:
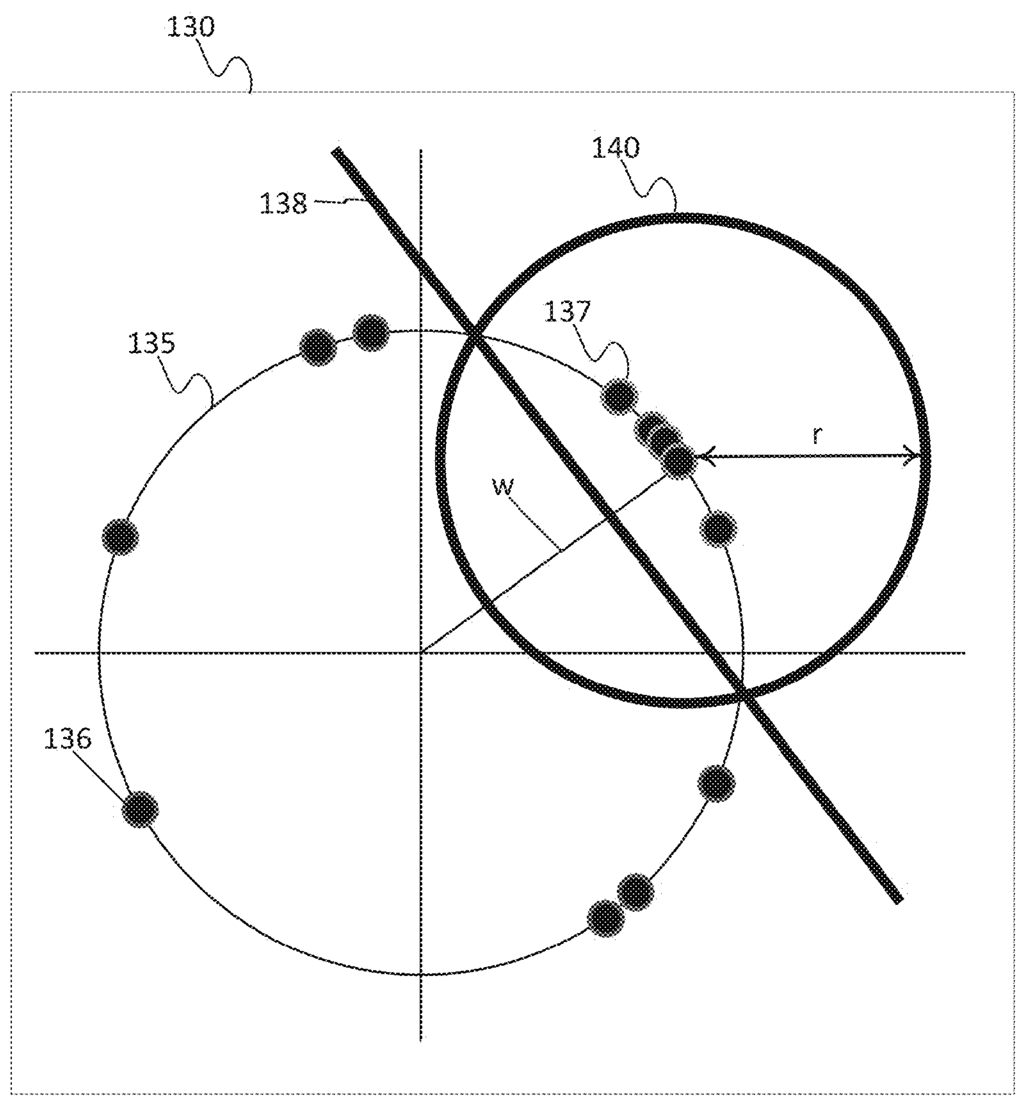
FIG. 4 illustrates an example target circle.

FIG. 4 illustrates the data space 130 including a target circle 140 having a radius r and centered at a vector c. The target circle 140 may be defined as a function of the classifier's weight vector w and decision threshold b as shown in Equations 2a and 2b.

$$c=w/\|w\| \qquad \text{Eq. 2a}$$

$$r=\sqrt{2-2b/w\|w\|} \qquad \text{Eq. 2b}$$

When a new input vector is received, the input vector is normalized to the uniform length or projected onto the hypersphere 135. If the input vector falls within the target circle 140, then the input vector necessarily satisfies Equation 1, as shown by the following proof based on x having unit length:

$$
\begin{aligned}
& x \text{ satisfies Eq. } 1 \\
& \Leftrightarrow w\cdot x-b\geq 0 \\
& \Leftrightarrow 2-2w/\|w\|\cdot x\leq 2-2b/\|w\| \\
& \Leftrightarrow 2+(x-w/\|w\|)\cdot(x-w/\|w\|)-x^2-w/\|w\|\cdot w/\|w\|\leq 2-2b/\|w\| \\
& \Leftrightarrow 2+(x-w/\|w\|)\cdot(x-w/\|w\|)-1-1\leq 2-2b/\|w\| \\
& \Leftrightarrow (x-w/\|w\|)\cdot\left(x-\frac{w}{\|w\|}\right)\leq 2-2b/\|w\| \\
& \Leftrightarrow \|x-w/\|w\|\|^2\leq 2-2b/\|w\| \\
& \Leftrightarrow \|x-w/\|w\|\|\leq\sqrt{2-2b/\|w\|}
\end{aligned}
$$

$\Leftrightarrow$ x is inside target circle defined by c (Eq. 2a) and r (Eq. 2b).

The range query for analyzing whether input vectors are included in the target circle may be implemented using a k-d tree including a hierarchy of splitting planes. Examining all of the vectors is avoided and results in significant time savings (relative to a brute force approach which examines all feature vectors). The k-d tree range queries may be performed in time logarithmic in the number of feature vectors. Therefore, the normalization of the feature vectors to a uniform length (e.g., projection onto the hypersphere 135) transforms the image detection into a range query, whose approximate solution may be found efficiently using a binary search tree. In one example, range queries may detect target images at about half the confidence level but at thirty times the speed as the full fidelity, brute force technique.

Figure 5:
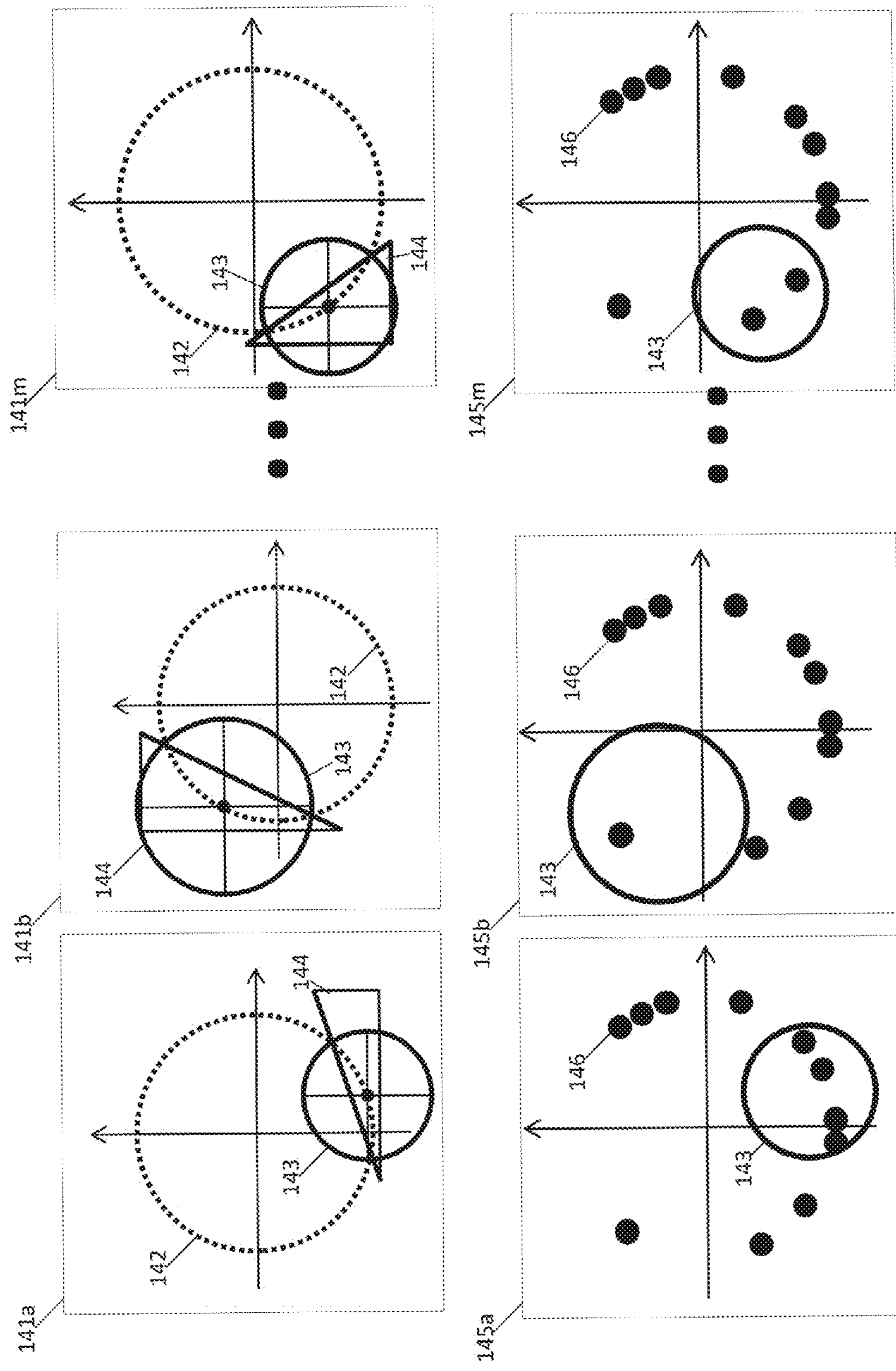
FIG. 5 illustrates an example set of classifiers.

FIG. 5 illustrates example graphs 141*a*-*m* to illustrate an array of classifiers. Each binary linear classifier includes an open matching space 144 defined by a hyper plane that divides the open matching space 144 from a non-matching space. Through the techniques described above, the open matching space 144 is converted to a closed matching space 143. The closed matching space may be examined using a range query. Graphs 145*a*-*m* illustrate that input feature vectors 146 are normalized to a uniform length. The input feature vectors that fall within the closed matching space 143 are considered matches. The closed matching space 143 overlaps the open matching space 144.

Figure 6:
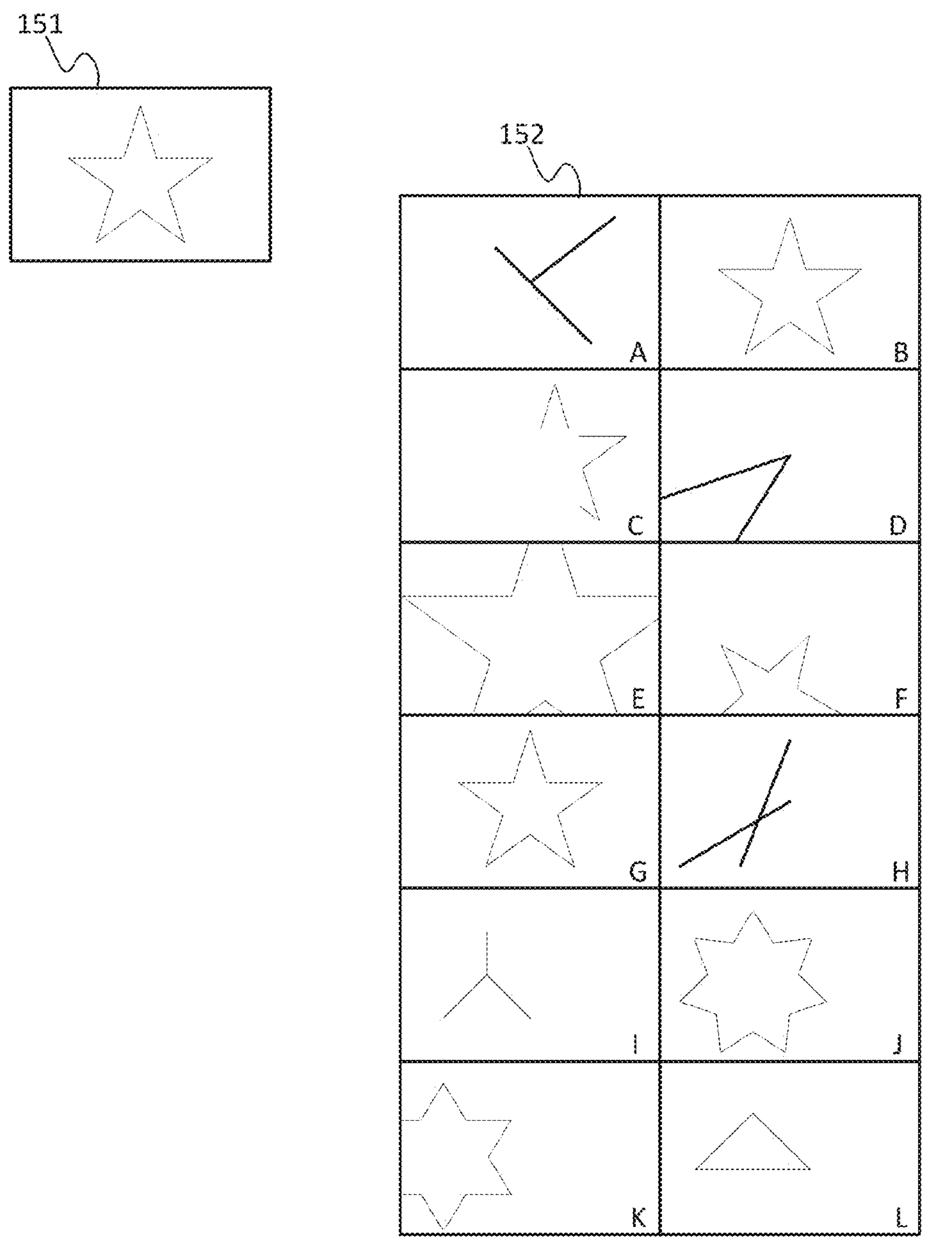
FIG. 6 illustrates example training image and resultant images.

FIG. 6 illustrates the image window 151 taken from a training image and image windows 152 taken from an input image. Image window 151 is a brand or logo that is used to identify a specific product, building, or point of interest in larger images. The image windows 152 may be all of the image windows (in the input image) that have feature vectors satisfying the classifier trained to detect instances of image window 151. Different subsets of the image windows 152 may be matched depending on the selection of the decision threshold b. When the decision threshold is strict, which may be a large b, the target circle 140 is smaller, and fewer matches are returned. For example, a strict decision threshold may only return close matches B and G. When the decision threshold is moderate, more matches are returned. For example, a moderate decision threshold may only return close matches B, C, E, F, G, J, and K. When the decision threshold is inclusive, which may be a small magnitude of b, the target circle 140 is larger, and even more matches are returned. For example, an inclusive decision threshold may only return all possible matches A through L.

An image window may be defined as follows. An image may be divided into cells, each having a predetermined size. The predetermined size may be square for example 8 pixels by 8 pixels or 16 pixels by 16 pixels. An image window may then be defined as a rectangular block of such cells. A feature vector $v_{i,j}$ may be computed for each cell. Vectors $v_{i,j}$ may have any number of components, such as 31. A feature vector for an image window may be defined as the concatenation of the feature vectors of its cells comprising the image window.

The feature vectors may be defined as histograms of oriented gradients (HOGs). A HOG is a statistical measure of counts occurrences of gradient orientation and may be computed in a localized portion of an image, such as a cell. In one example, each HOG includes gradient values calculated from a point discrete derivative mask in both of the horizontal and vertical directions of the image. The color or intensity values for the gradients may be filtered or normalized. The HOG cell histograms are defined by the gradient values. Each pixel in a cell contributes a weighted vote for the orientation based histogram. In order to account for changes in illumination and contrast, the gradient strengths are locally normalized by grouping the cells in spatially connected blocks. The HOG is the vector of the components of the normalized cell histograms. Alternatively, the feature vectors may be described using scale invariant feature transforms (SIFT).

A HOG pyramid is a group of HOGs with varying levels of detail. The HOG pyramid allows for a target image to be detected at different sizes and/or levels of resolution. Each level in the HOG pyramid is downsampled from the image of the previous level. In one example, a HOG vector for a window that coincides with that of a M by N block of cells is formed by concatenating the feature vectors $v_{i,j}$ for each cell into a single vector. The single vector will have a length equal to the length of the feature vectors×M×N.

The feature vector v may be normalized into a unit length feature vector u according to Equations 4-6. The configurable constant k is the number of dimensions of the feature vectors.

$$u=(v-\mu)/\sigma \quad \text{Eq. 4}$$

$$\mu=\frac{1}{k}\sum_{i=1}^{k}v_i \quad \text{Eq. 5}$$

$$\sigma^2=\frac{1}{k}\sum_{i=1}^{k}(v_i-\mu)^2 \quad \text{Eq. 6}$$

Figure 7:
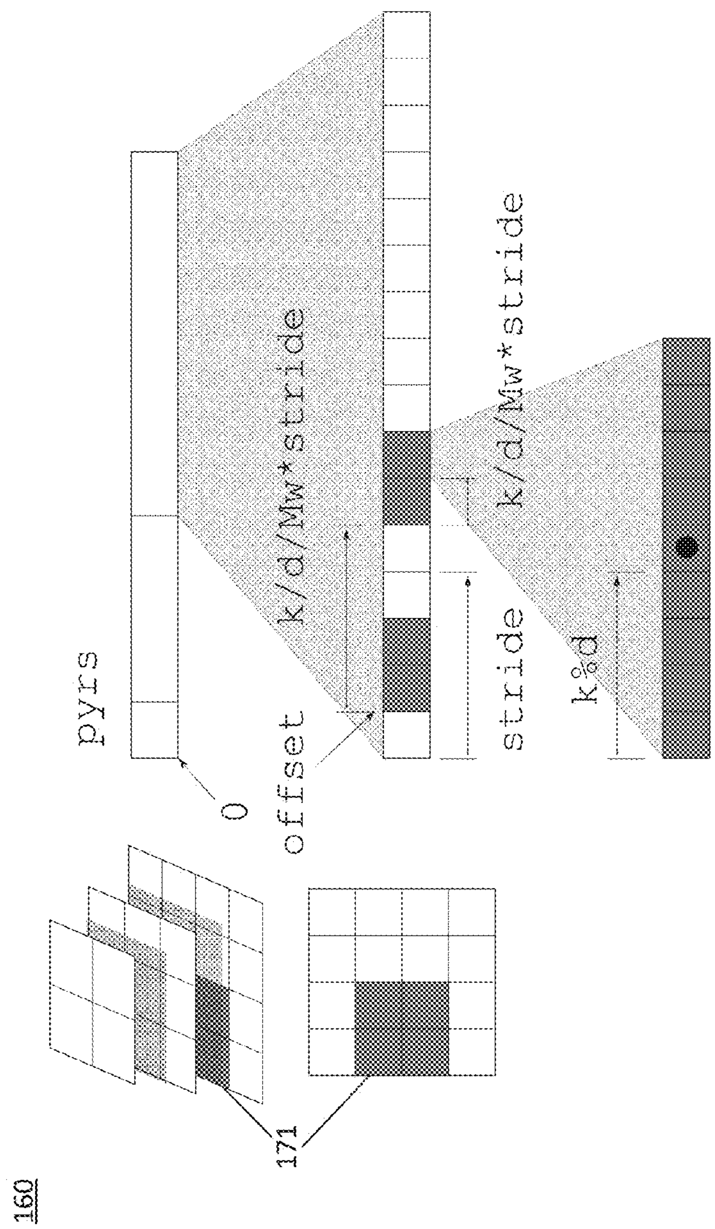
FIG. 7 illustrates an example histogram pyramid.

FIG. 7 illustrates an example histogram pyramid in an example memory layout. A HOG may be stored in memory in a single array "pyrs" as the concatenation of the levels of the HOG pyramid. Each level of the HOG pyramid is a concatenation of the HOG cells. The HOG pyramid arrangement itself is the technique to lay out the data in memory. In one example, the formation of k-d trees involve an explicit listing of vectors. The set of instructions executable by a computer processor and configured to create the k-d tree may be referred to as a k-d tree builder.

The k-d tree builder is configured to operate on submatrices of a matrix of vectors. The matrix of vectors includes a number of vectors, each having a length L. Table 1 illustrates an example matrix of vectors.

TABLE 1

| | | | |
|---|---|---|---|
| $V_{1,1}$ | $V_{1,2}$ | $V_{1,3}$ | $V_{1,4}$ |
| $V_{2,1}$ | $V_{2,2}$ | $V_{2,3}$ | $V_{2,4}$ |
| $V_{3,1}$ | $V_{3,2}$ | $V_{3,3}$ | $V_{3,4}$ |

A feature vector is a 3×3 sub-matrix of vectors. The elements $V_{i,j}$ in the sub-matrix of vectors may each represent a pixel and comprise a red value, a green value, and blue value, or another set of colors. The sub-matrix of vectors may be referred to as an image patch. Using Table 1, each feature vector has a size 3×3×L. There are four possible feature vectors in Table 1, which may be stored in memory in the following sequences: Explicitly listing these feature vectors gives the following layout in memory: [$v_{1,1}$ $v_{2,1}$ $v_{3,1}$ $v_{1,2}$ $v_{2,2}$ $v_{3,2}$ $v_{1,3}$ $v_{2,3}$ $v_{3,3}$] [$v_{2,1}$ $v_{3,1}$ $v_{4,1}$ $v_{2,2}$ $v_{3,2}$ $V_{4,2}$ $v_{2,3}$ $v_{3,3}$ $v_{4,3}$] [$v_{1,2}$ $v_{2,2}$ $v_{3,2}$ $v_{1,3}$ $v_{2,3}$ $v_{3,3}$ $v_{1,4}$ $v_{2,4}$ $v_{2,4}$ $v_{3,4}$] [$v_{2,2}$ $v_{3,2}$ $v_{4,2}$ $v_{2,3}$ $v_{3,3}$ $v_{4,3}$ $v_{2,4}$ $v_{3,4}$ $v_{4,4}$]. This layout in memory has 4×3×3×L numbers, which consumes more memory than the total amount of data.

In another example, the data in Table 1 is laid out sequentially using an "offset" and a "stride." For example, all of the vectors in Table 1 may be laid out sequentially as: $v_{1,1}$ $v_{2,1}$ $v_{3,1}$ $v_{4,1}$ $v_{1,2}$ $v_{2,2}$ $v_{3,2}$ $v_{4,2}$ $v_{1,3}$ $v_{2,3}$ $v_{3,3}$ $v_{4,3}$ $v_{1,4}$ $v_{2,4}$ $v_{3,4}$ $v_{4,4}$. The offsets are defined as the starting points (upper left corner) for the feature vectors above. $V_{1,1}$ corresponds to an offset of 0, $v_{2,1}$ corresponds to an offset of 1, $v_{1,2}$ corresponds to an offset of 4, and $v_{2,2}$ corresponds to an offset of 5. The stride is the number of array elements in that level.

Thus, the binary search tree is constructed according to the offset into sequential listing of vectors such that the i-th component is indexed by offset+i. The stride value describes the number of elements in a column of that vector. The memory index of the i-th components of a vector represented by offset and stride is computed using the following pseudocode:

$$\text{index}=\text{offset}+i/d/M*\text{stride}+i/d\ \%\ M*d+i\ \%\ d$$

The target image may be a brand or logo that is used to identify a specific product, building, or point of interest in larger images. A plurality of classifiers, each specifying feature vectors and decision thresholds, may be generated for a single target image. The classifiers are designed to encompass and capture a variety of appearances and viewing conditions of the target image. The variety of appearances may changes according to viewpoints, spatial interference, or the presence of occlusion. Each of the plurality of classifiers may be trained to detect instances of a specific part of the target image.

Figure 8:
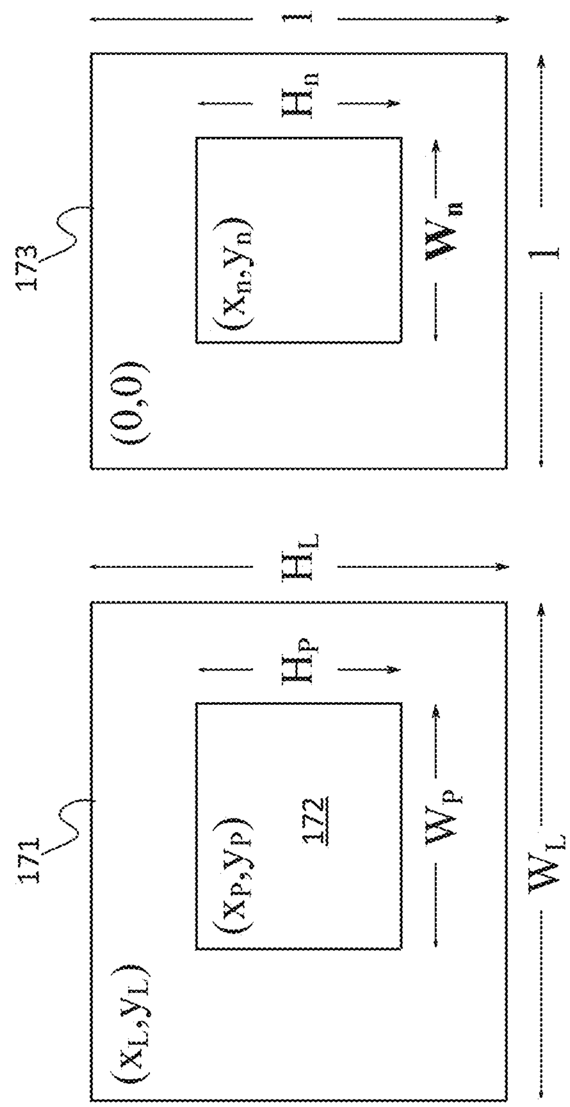
FIG. 8 illustrates an example window of a target image.

FIG. 8 illustrates a window 172 of a target image 171, which may be used in a logo detector. In one example, a window is considered high contrast if at least ¼ of the cells in the window have variance in pixel luminance greater than $30^2$. The image window overlaps the target image is at least ¼ of the cells overlap the target image. The window 172 and target image 171 may be normalized to a unit square. The windows that overlap the target image are mapped into a normalized coordinate frame. Once normalized to the unit square the window can be statistically analyzed in order to define the classifier.

FIG. 8 illustrates the normalized coordinates ($x_n$, $y_n$, $w_n$, $H_n$) of window 172 at ($x_p$, $y_p$, $W_p$, $H_p$) with respect to the target image 171 at ($x_L$, $y_L$, $H_L$). The normalized coordinates and dimensions may be calculated according to Equations 7-10.

$$x_n = \frac{x_P - x_L}{W_L} \qquad \text{Eq. 7}$$

$$y_n = \frac{y_P - y_L}{H_L} \qquad \text{Eq. 8}$$

$$W_n = \frac{W_P}{W_L} \qquad \text{Eq. 9}$$

$$H_n = \frac{H_P}{H_L} \qquad \text{Eq. 10}$$

For the example, in a logo detector computer program, each classifier has a set of normalized box coordinates (in addition to being specified by a weight vector and a decision threshold) which specifies the part or parts of a logo that the classifier detects. A classifier may have more than one normalized box coordinate if the classifier is trained to detect a visual pattern that occurs in more than one place on a logo (for example, a classifier trained to detect the window containing the star pattern may detect the star pattern in multiple locations on the same logo). A classifier's set of normalized box coordinates is determined during training as described in FIG. 5. This set of normalized box coordinates is used during detection for generating one or more hypotheses for each positively classified window. For each window located at (x, w) and having height H and width W a hypothesis for the full logo extent is calculated as Equation 11.

$$\left(x - \frac{W}{W_n}x_n,\ y - \frac{H}{H_n}y_n,\ \frac{W}{W_n},\ \frac{H}{H_n}\right) \qquad \text{Eq. 11}$$

Equation 11 is configured to calculate the full extent of a logo given the extent of just part of the logo. For example, suppose a classifier includes a single normalized box coordinate (0.25, 0.25, 0.5, 0.5), and this classifier is trained to detect the center part of a logo. If applying the classifier to a 640 pixel by 480 pixel image results in a positively classified window at (120, 100, 64, 64), then the hypothesis states that the full logo is located at (120-64/0.5*0.25, 100-64/0.5*0.25, 64/0.5, 64/0.5)=(88, 68, 128, 128) in the image.

Figure 9:
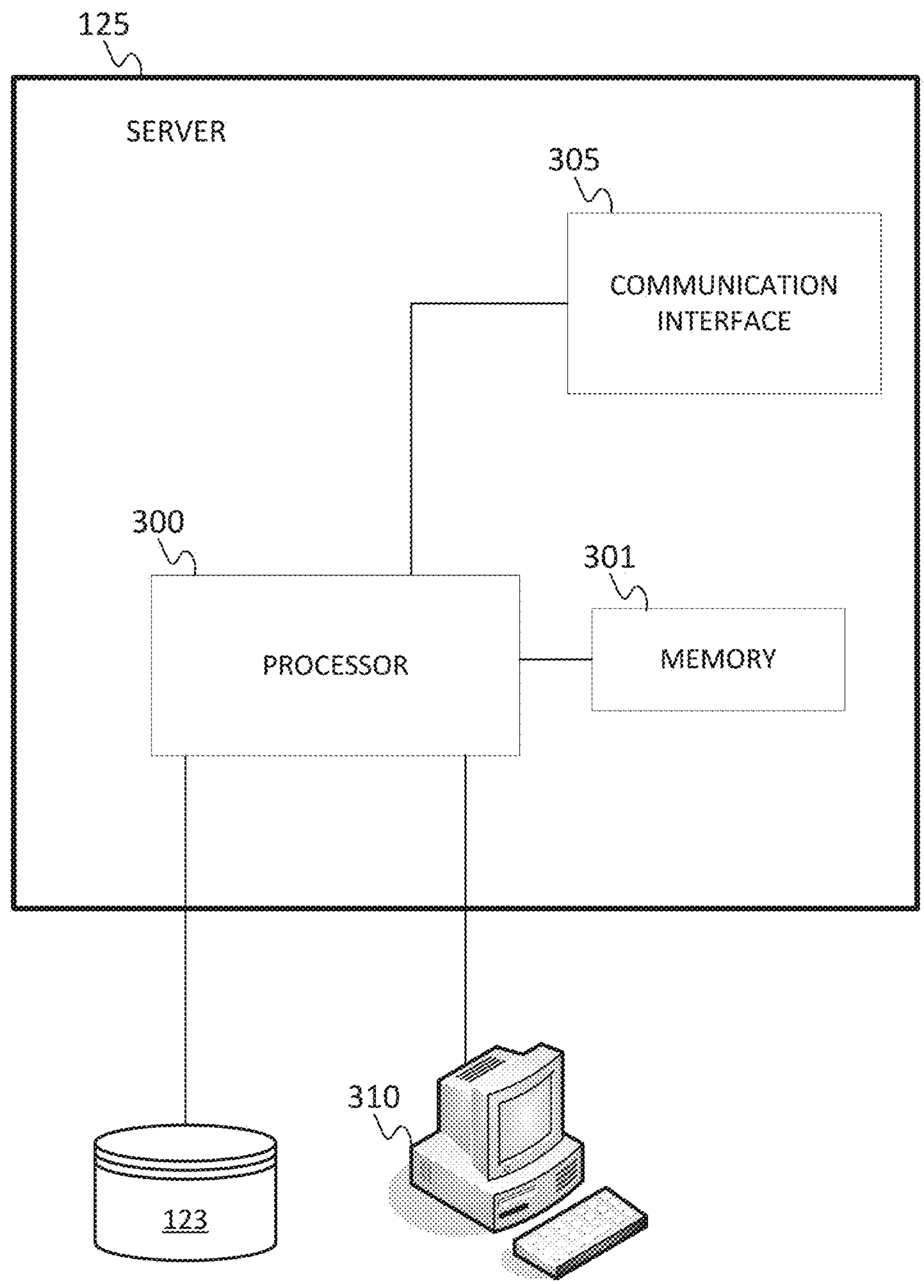
FIG. 9 illustrates an exemplary server of the system of FIG. 1.

FIG. 9 illustrates an exemplary server 125 of the system of FIG. 1. The server 125 includes a processor 300, a communication interface 305, and a memory 301. The server 125 may be coupled to a database 123 and a workstation 310. The workstation 310 may be used as an input device for the server 125. In addition, the communication interface 305 is an input device for the server 125. The communication interface 305 receives data indicative of use inputs made via the workstation 128 or the mobile device 122.

The memory 301 is configured to store feature vectors associated with a portion of a target image. The feature vectors may include image attributes of the target image. The image attributes may describe image edges and arrangement of the edges. The feature vectors are moderately unique descriptors of the components of the target image. The feature vectors provide a fingerprint of the target image. The feature vectors may describe the target image at varying sizes, orientations, and resolutions.

The processor 300 is configured to compute uniform length feature vectors from parts of an image. Uniform length feature vectors simplify the matching space by defining the matching space as a closed geometric shape. In one example, the feature vectors are projected onto a hypersphere and a portion of the hypersphere defines the closed matching space. The non-matching space may include other portions of the hypersphere or outside of the hypersphere.

The processor 300 is configured to identify input feature vectors that fall within the matching space. For example, the processor 300 identifies based on a range query defined by the closed matching space. The range query may involve traversing a k-d tree.

The processor 300 may be configured to calculate the center and radius of a range query using a weight vector and decision threshold, according to Eq. 2a and Eq. 2b. The processor 300 may receive the weight vector and decision threshold from database 123.

Alternatively, the range query may be set to $\sqrt{2-2b}$ with b as the decision threshold. The decision threshold may be a scalar or a vector. The vector defining the decision threshold may have the same number of or one fewer components as the feature vectors. The matching space may be centered at the query vector and have a radius of the range query distance.

The target image may be used in navigation-related application or mapping-relation application. When the query image matches the target images, the processor 300 may identify the query image as a particular type of object. The object may be a license plate, a door, a brand logo, a road sign, a sign, or another object. The processor 300 may be configured to generate map data based on the identification of the query image. For example, the processor 300 may insert a point of interest, a destination, a segment, or an advertisement into a geographic database 123. The processor 300 may be configured to insert a link to a URL or other information at the location of the query image according to a match with the target image.

The geographic database 123 includes information about one or more geographic regions. Each road in the geographic region is composed of one or more road segments. A road segment represents a portion of the road. The road segment may be identified using a target image and added to the geographic database 123 in response to a match with the target image.

Each road segment is associated with two nodes (e.g., one node represents the point at one end of the road segment and the other node represents the point at the other end of the road segment). The node at either end of a road segment may correspond to a location at which the road meets another road, i.e., an intersection, or where the road dead-ends. The road segment data record may include data that indicate a speed limit or speed category (i.e., the maximum permitted vehicular speed of travel) on the represented road segment. The road segment data record may also include data that indicate a classification, such as a rank of a road segment that may correspond to its functional class. The road segment data may include data identifying what turn restrictions exist at each of the nodes which correspond to intersections at the ends of the road portion represented by the road segment, the name or names by which the represented road segment is known, the length of the road segment, the grade of the road segment, the street address ranges along the represented road segment, the permitted direction of vehicular travel on the represented road segment, whether the represented road segment is part of a controlled access road (such as an expressway), a ramp to a controlled access road, a bridge, a tunnel, a toll road, a ferry, and so on. The classification may be determined according to a match with a target image representative of a specific functional class of segment.

The navigation-related features may include a route calculation application. End users may access a route from an origin to a destination. The route calculation application determines the route for the end user to travel along the road segments to reach the desired destination. In order to calculate a route, the route calculation application is provided with data identifying a starting location (origin) and a desired destination location. In one embodiment, the starting location may be the end user's current position and the destination may be entered by the end user. Given at least the identification of the starting location (origin) and the desired destination location, the route calculation application determines one or more solution routes between the starting location and the destination location. A solution route is formed of a series of connected road segments over which the end user can travel from the starting location to the destination location. When the route calculation application calculates a route, the application accesses the geographic database 123 and obtains data that represent road segments around and between the starting location and the destination location. The road calculation application uses the data to determine at least one valid solution route from the starting location to the destination location. The at least one valid solution route may be displayed to the user in the rendering of the geographic region such that addresses or points of interest along the route may be selected to display street side imagery. Possible origins and destinations may be identified from the street side imagery using a collection of target images that represent logos, doors, addresses, mailboxes, signs, or other objects.

In one embodiment, the route calculation application may attempt to find a solution route that takes the least time to travel. The segment cost or travel time for the particular represented road segment considers the type of road, such as freeway or residential street, speed limit and distance of the segment. In one embodiment, the route calculation application may consider traffic conditions to more accurately reflect actual travel time over the connected road segments. When the route calculation application determines one or more solution routes comprising the series of connected road segments, the travel times for each of the included connected road segments is summed to provide an estimated route travel time. Based on the route travel time, the route calculation application selects the quickest route. Once the route calculation application has selected the route, the route calculation application provides an output in the form of an ordered list identifying a plurality of road segments that form the continuous navigable route between the origin and the destination. In addition, the route calculation program provides an output of an estimated route travel time.

The map-related features may be any of the navigation-related features provided to the user without reference to the current location of the user or the device. In addition, map-related features may include display and manipulation of a map of a geographic region. The map-related features may be provided without navigation-related features.

Figure 10:
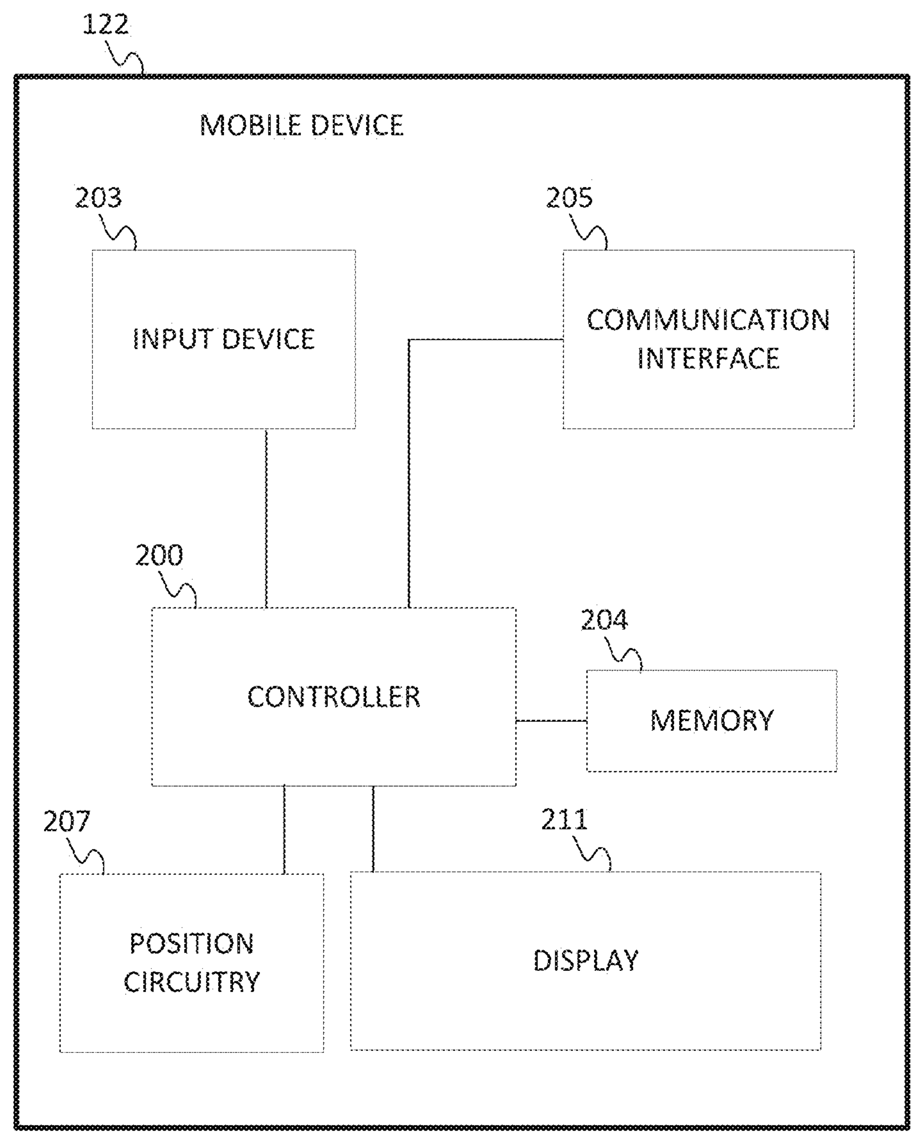
FIG. 10 illustrates an exemplary mobile device of the system of FIG. 1.

FIG. 10 illustrates an exemplary mobile device 122 of the system of FIG. 1. The mobile device 122 includes a controller 200, a memory 204, an input device 203, a communication interface 205, position circuitry 207, and a display 211. The workstation 128 may include at least a memory and processor and may be substituted for the mobile device in the following endpoint-based embodiments. In the following endpoint-based embodiments, the mobile device 122 or the workstation 128 performs a majority of the processing.

Figure 11:
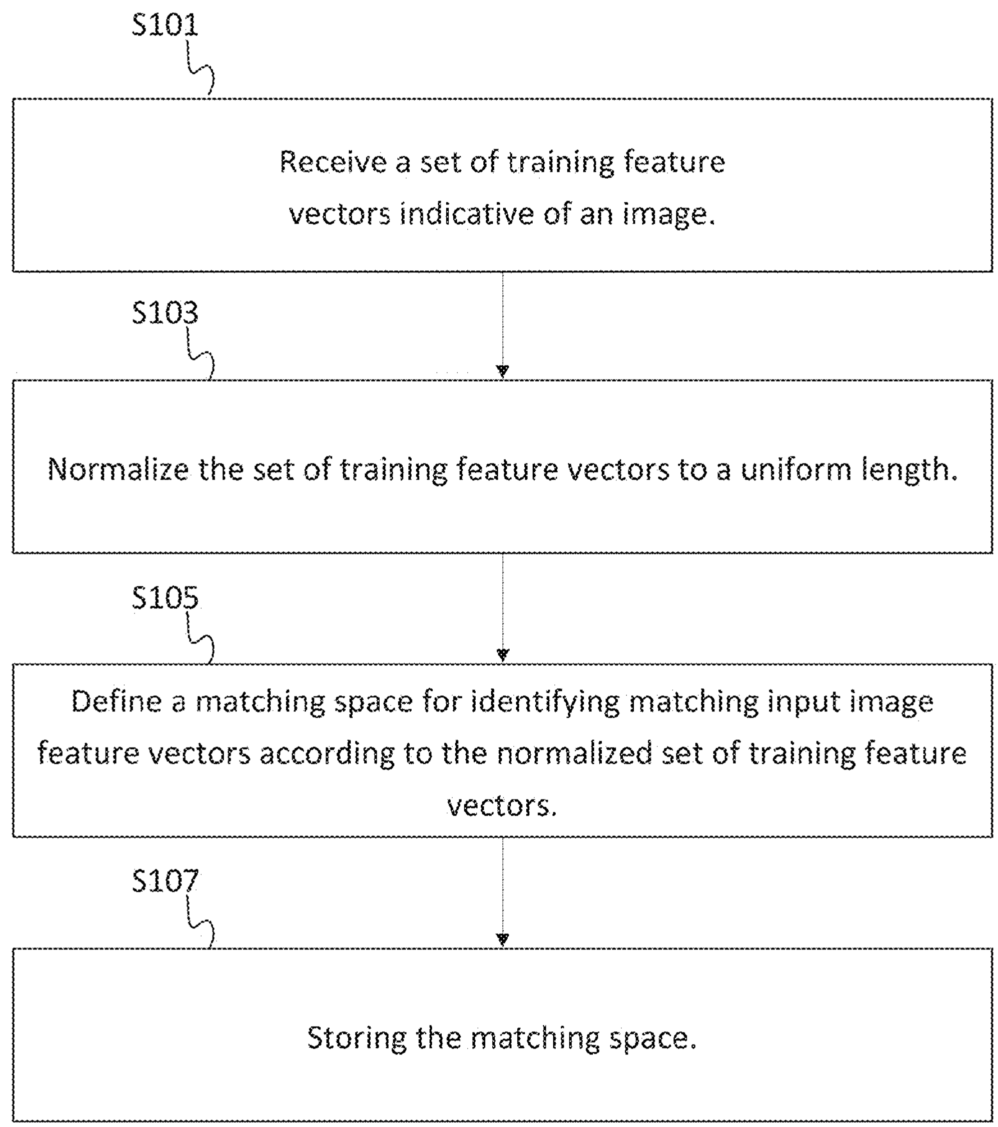
FIG. 11 illustrates an example flowchart for the training of classifiers used for image pattern recognition.

In one example, the training of classifiers as illustrated in FIG. 11 may be performed on server 125 or mobile device 122. Either controller 200 of the mobile device 122 and process 300 of the server 125 are referred to as the "controller" in the following descriptions. Additional, different, or fewer acts may be provided. For example, acts associated with the different modes may be provided.

At act S101 the controller receives a set of training feature vectors indicative of one or more images. The one or more images are referred to as training images. At act S103, the controller normalizes the set of training feature vectors to a uniform length. The controller may identify matching and non-matching training feature vectors. At act S105, the controller defines a matching space according to the normalized set of training feature vectors. The matching space separates matching training feature vectors from non-matching training feature vectors. Subsequent input feature vectors that fall within the matching space are positive, and subsequent input feature vectors that fall outside of the matching space are negative. At S107, the controller stores the matching space. For example, the matching space may be stored as a weight vector and a decision threshold, which defines a classifier.

Figure 12:
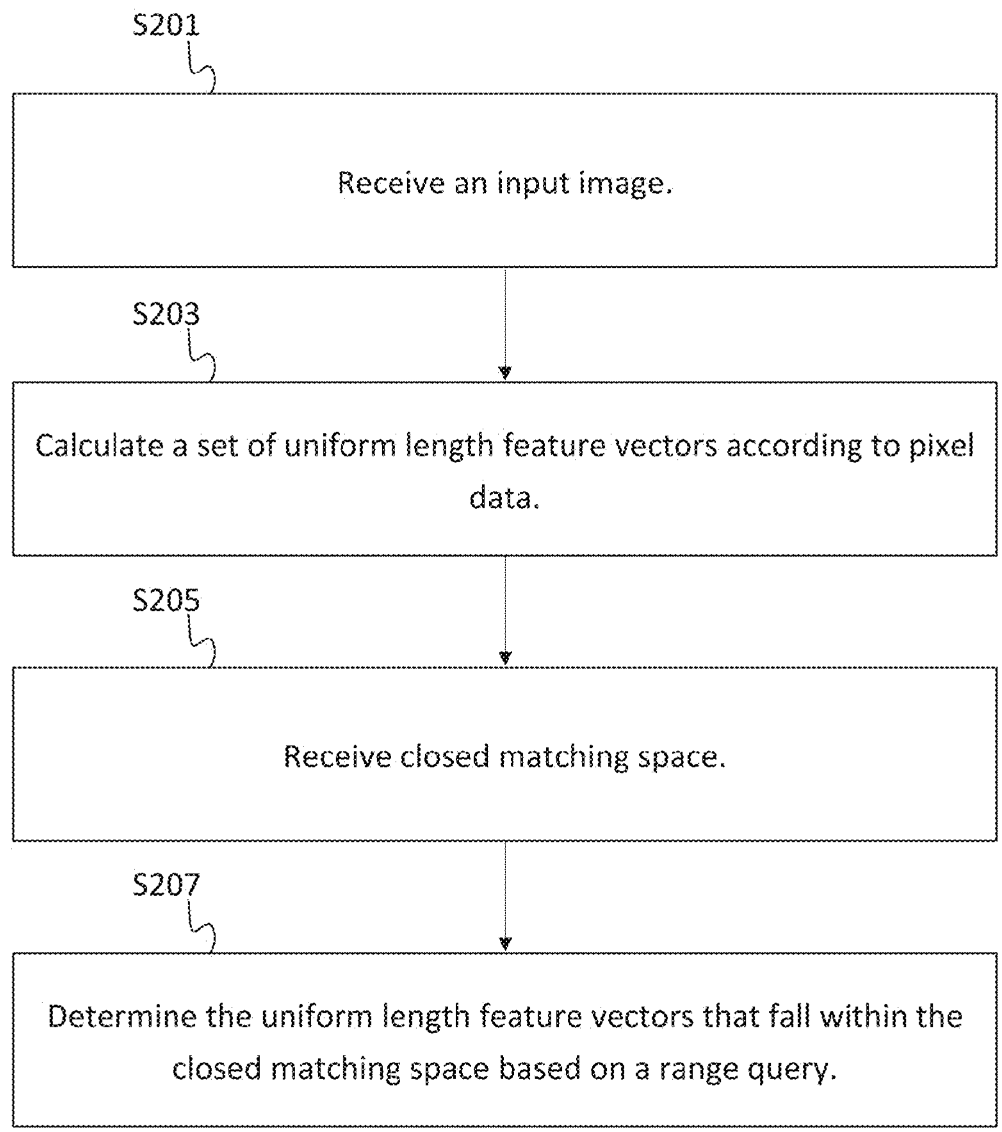
FIG. 12 illustrates an example flowchart for image pattern recognition.

The resulting classifiers may be received at the mobile device 122 and stored on mobile device memory 204. Application of a classifier to an input image may be performed on mobile device 122 (or by server 125 in other implementations). FIG. 12 illustrates an example flowchart for executing range queries and detecting target images in the input image, which is described in relation to the mobile device 122 but may be performed by another device. Additional, different, or fewer acts may be provided. For example, acts associated with the different modes may be provided.

At act S201, the communication interface 205 or the controller 200 receives an input image. At act S203, the controller 200 may calculate a set of uniform length feature vectors according to pixel data of the input image. A uniform length feature vector may be a gradient of differences in intensity, color, or luminance of neighboring pixels. A uniform length feature vector identifies an image part based on the gradient.

At act S205, the controller retrieves/receives one or more classifier from some form of storage or input, which may be a mobile device memory 204, input device 203, or a communication interface 205. The matching space stored in acts S107 may define the classifier. The classifier retrieved/received may depend on the visual pattern the mobile device

122 is configured, possibly by the user, to detect. A classifier may be represented in storage as a weight vector and a decision threshold. Alternatively, a classifier may be represented in storage by its corresponding range query center and radius, as computed by Eq. 2a and Eq. 2b.

At act S207, the controller 200 determines the subset of uniform length input image feature vectors that falls within the retrieved/received classifier's matching space based on a range query. The controller 200 may need to compute a range query center and radius from the retrieved/received classifier's weight vector and decision threshold using Eq. 2a and Eq. 2b. The range query performed by controller 200 may be an approximate range query for further timesaving at the expense of a small loss in accuracy. The part of the input image corresponding to a uniform length input image feature vector that falls within the retrieved classifier's matching space is then an instance of the visual pattern that the classifier was trained to detect.

The input device 203 may be configured to receive a classifier or a selection of the classifier from storage such as mobile device memory 204 or database 123. The input device 203 may be one or more buttons, keypad, keyboard, mouse, stylist pen, trackball, rocker switch, touch pad, voice recognition circuit, or other device or component for inputting data to the mobile device 122. The input device 203 and the display 211 may be combined as a touch screen, which may be capacitive or resistive. The display 211 may be a liquid crystal display (LCD) panel, light emitting diode (LED) screen, thin film transistor screen, or another type of display.

The positioning circuitry 207 is optional and may be excluded for the map-related functions. The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122. The mobile device 122 may retrieve street side imagery in a proximity to the mobile device based on the location data and perform image detection using a set of target images to identify objects or locations of interest. The target images may identify restaurants, entertainments, or other businesses.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 201 and/or memory 301 may be a volatile memory or a non-volatile memory. The memory 201 and/or memory 301 may include one or more of a read only memory (ROM), random access memory (RAM), a flash memory, an electronic erasable program read only memory (EEPROM), or other type of memory. The memory 201 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:

identifying a plurality of feature vectors associated with a selection portion of a test image;

normalizing, using a processor, the plurality of feature vectors in a vector space to a uniform length;

defining, using the processor, a matching portion in the vector space according to an image of a point of interest;

selecting at least one of the normalized feature vectors included in the matching portion of the vector space;

determining, using the processor, that the test image is a match for the point of interest;

generating, using the processor and in response to the match with the test image, a link for the point of interest; and providing the link associated with the test image for the point of interest to a mapping application or a navigation application, wherein the link is associated with information for the point of interest.

2. The method of claim 1, further comprising:

projecting the normalized feature vector on a hypersphere centered at an origin of the vector space.

3. The method of claim 1, further comprising: defining a window; and sliding the window across the test image to define portions of the test image and associated feature vectors.

4. The method of claim 1, further comprising:

defining a plurality of classifiers each have a different matching portion in the vector space, wherein each different matching portion is associated with a portion of the image of the point of interest.

5. A method comprising:

identifying a plurality of feature vectors associated with a selection portion of a test image;

normalizing, using a processor, the plurality of feature vectors in a vector space;

defining, using the processor, a matching portion in the vector space according to an image of a point of interest;

selecting at least one of the normalized feature vectors included in the matching portion of the vector space; and determining, using a processor, that the test image is a match for the point of interest, wherein the image of the point of interest is associated with a road segment in a geographic database.

6. The method of claim 1, wherein defining the matching portion in the vector space comprises:

performing a range query to determine the matching portion in the vector space.

7. An apparatus comprising:

at least one processor; and at least one memory including computer program code for one or more programs; the at least one memory and the computer program code configured to, with the at least one processor, cause the apparatus to at least:

identify a plurality of feature vectors associated with a selection portion of a test image;

normalize the plurality of feature vectors in a vector space;

define a matching portion in the vector space according to an image associated with a road segment select at least one of the normalized feature vectors included in the matching portion of the vector space; and determine that the test image is a match for the road segment.

8. The apparatus of claim 7, the at least one memory and the computer program code configured to, with the at least one processor, cause the apparatus to at least: project the normalized feature vector on a hypersphere centered at an origin of the vector space.

9. The apparatus of claim 7, the at least one memory and the computer program code configured to, with the at least one processor, cause the apparatus to at least:

define a window; and slide the window across the test image to define portions of the test image and associated feature vectors.

10. The apparatus of claim 7, the at least one memory and the computer program code configured to, with the at least one processor, cause the apparatus to at least:

define a plurality of classifiers each have a different matching portion in the vector space, wherein each different matching portion is associated with a portion of the image of the road segment.

11. The apparatus of claim 7, wherein the image of the road segment is associated with a point of interest.

12. The apparatus of claim 7, wherein the matching portion in the vector space is defined based on a range query.

13. The method of claim 1, wherein the image of the point of interest is associated with a road segment.

14. The method of claim 1, wherein the image includes a logo that identifies the point of interest.

15. The method of claim 1, wherein the point of interested is added to a geographic database associated with the mapping application or the navigation application.

16. The method of claim 1, further comprising:

generating map data in response to the test image being a match for the point of interest.

17. The apparatus of claim 7, the at least one memory and the computer program code configured to, with the at least one processor, cause the apparatus to at least:

generate map data in response to the test image being a match for the road segment.

18. The apparatus of claim 7, the at least one memory and the computer program code configured to, with the at least one processor, cause the apparatus to at least:

add the road segment to a geographic database in response to the test image being a match for the road segment.

* * * * *